Inventors
James W. Barbour
Lawrence B. Porter
By Burmeister, Kulie, Southard & Godula
Attorneys

United States Patent Office 3,514,809
Patented June 2, 1970

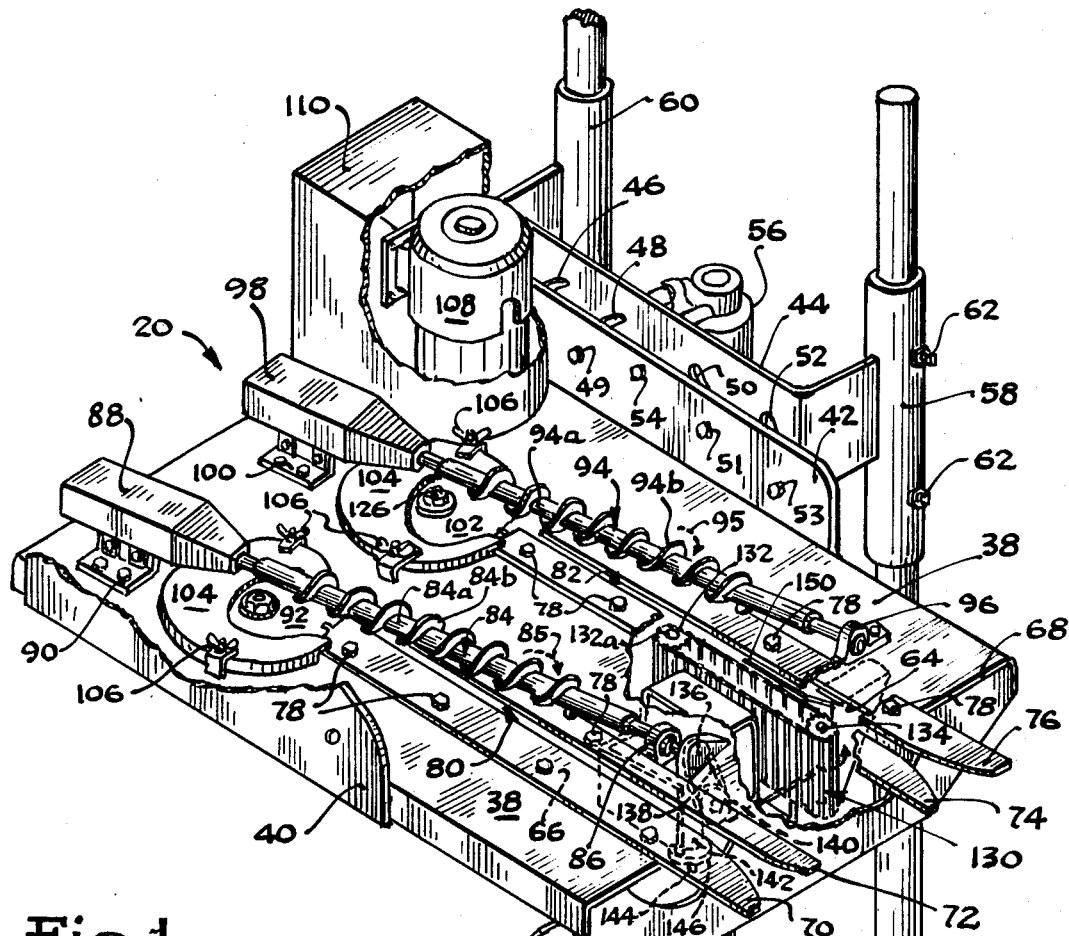
Fig.1
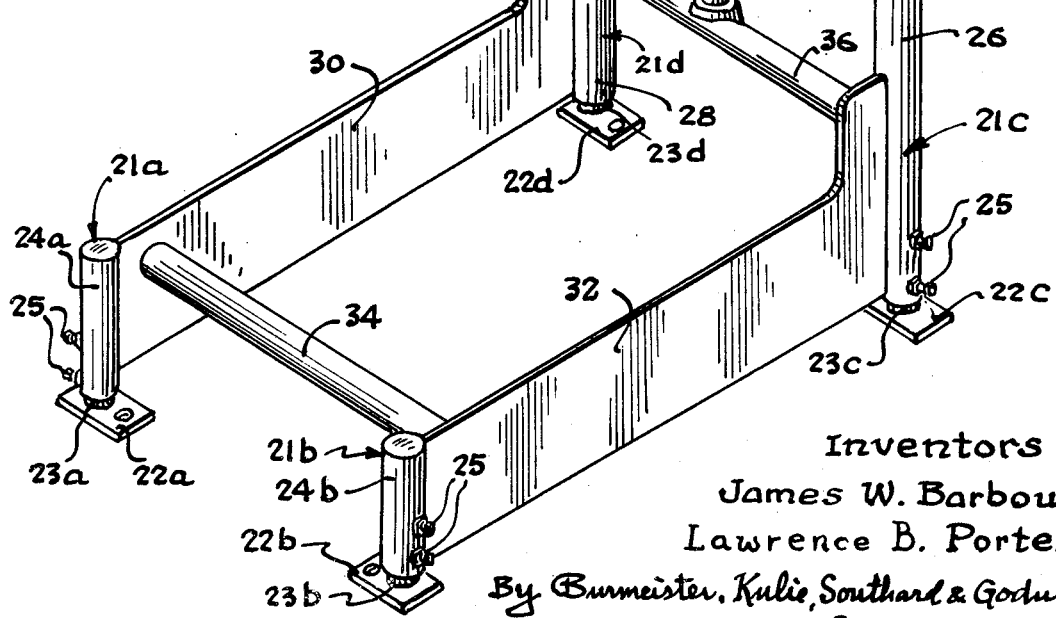
Inventors
James W. Barbour
Lawrence B. Porter
By Burmeister, Kulie, Southard & Godula
Attorneys

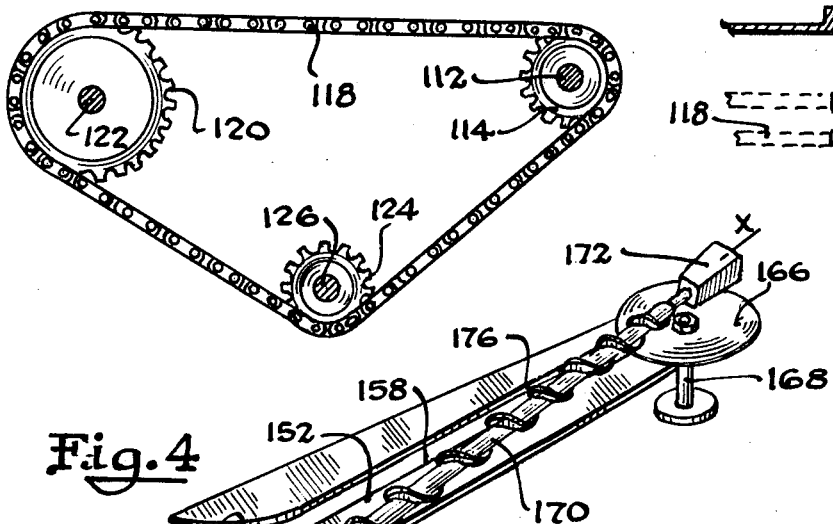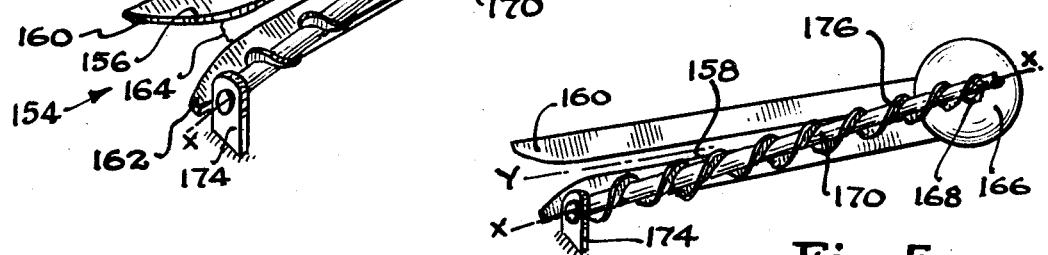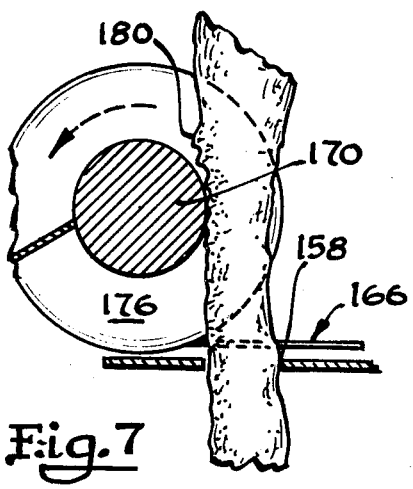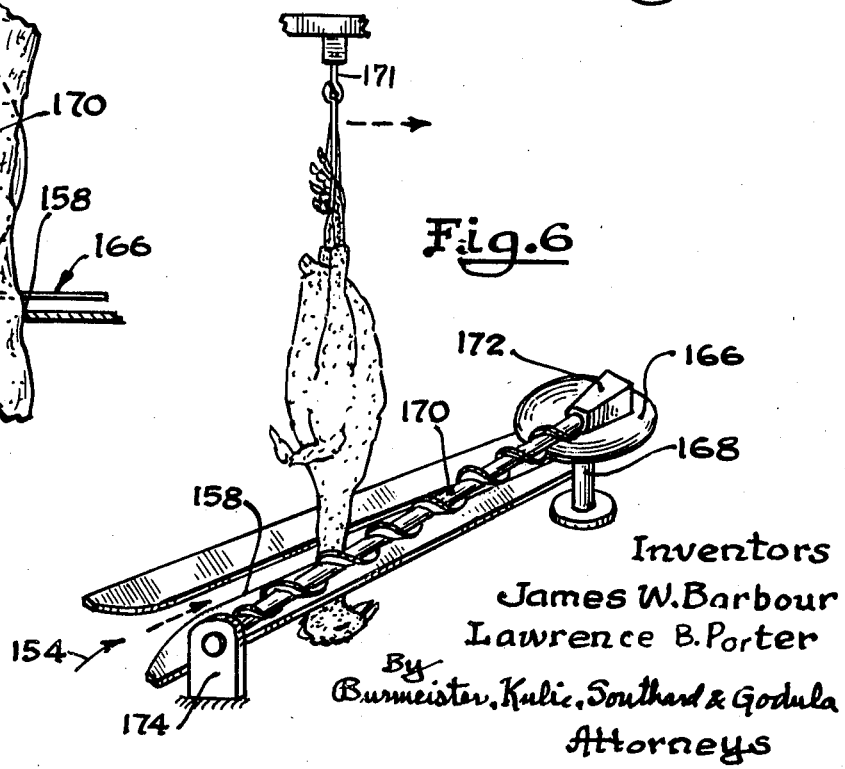
Inventors
James W. Barbour
Lawrence B. Porter
By Burmeister, Kulie, Southard & Godula
Attorneys June 2, 1970  J. W. BARBOUR ET AL  3,514,809
APPARATUS FOR REMOVING HEADS FROM BIRDS
Filed Nov. 8, 1967  3 Sheets-Sheet 3

3,514,809
APPARATUS FOR REMOVING HEADS
FROM BIRDS
James W. Barbour, and Lawrence B. Porter, Chicago,
Ill., assignors to John Mohr & Sons, Chicago, Ill., a
corporation of Illinois
Filed Nov. 8, 1967, Ser. No. 681,536
Int. Cl. A22c 21/00
U.S. Cl. 17—12                                    8 Claims

ABSTRACT OF THE DISCLOSURE

A method and apparatus for processing poultry to remove the heads from birds wherein the pendulously supported bird is delivered to a guide means which orients and captures the head of the bird at the base of the skull and wherein means are provided to lift the neck skin away from the skull while transporting the head toward the severing means to cut the head from the neck of the bird substantially at the base of the skull.

---

The present invention relates to an improved method and apparatus for processing birds and more particularly it relates to an improved method and apparatus for processing birds or poultry wherein the heads are severed from the bodies of birds at a position immediately adjacent the base of the skull of the bird while leaving substantially all of the neck skin with the body of the bird after severing of the head.

PRIOR ART

Poultry is sold on the market in varying stages of readiness for cooking or preparation for consumption by humans. Apparatus and methods for processing poultry for use in the market include means for processing poultry such as chicken, turkeys, duck, geese, and the like. It generally is desirable, however, to remove the feathers, internal organs, feet and the head from poultry to be sold for human consumption.

Various methods and devices have been developed over the years to minimize the expense involved in processing poultry for use in the market. The present invention is particularly directed to a method and apparatus for the removal of heads from the bodies of birds. Devices of this type have been and presently are available on the market which automatically remove the head from the bird as it passes down the processing line. Some of these devices involve physically pulling the head from the body of the bird until separation occurs by tearing of the muscle, skin and bone structure of the bird. Generally, this means of removal of heads is unsatisfactory in that the severing is done in a relatively random manner. Other more common methods and apparatus involve moving a bird along a processing line into the path of a cutting blade or saw. Devices of this type commonly employ a guide channel to direct the head of the bird into the path of the cutting member. Generally the guide path is tapered to assure initial capture of the head of the bird and then to guide the bird into the path of the cutting blade. Still other types of cutting means involve the typical guillotine where the head of the bird is pulled over a suitable guide and, when in the appropriate position, a blade is dropped to sever the head from the body of the bird.

The present invention is directed to the provision of an improved method and apparatus for the removal of heads from birds. In contemplates positioning and orientation of the head of the bird in a manner such that the beak is directed toward the cutting means, pulling the head of the bird into and along a guide channel where the base of the skull is trapped just below the guide channel while moving the loose neck skin of the bird away from the head prior to severing of the head from the body. The captured head of the bird then is moved into the path of the cutting means and is severed at the base of the skull to retain the maximum neck portion of the bird and, because of the neck skin conditioning prior to cutting, to retain substantially all of the neck skin of the bird.

It is, accordingly, a general object of the present invention to provide an improved method and apparatus for removing heads from birds.

Another object of the present invention resides in the provision of an improved method for removing heads from birds wherein the head is initially captured and the neck skin pulled away from the head prior to severing, and wherein the head is severed from the body of the bird substantially at the base of the skull.

Still another object of the present invention resides in the provision of an improved method for removing heads from birds wherein the head of the bird is oriented with the beak toward the cutting means and wherein the head is severed from the bird while cutting from the beak towards the back of the head of the bird substantially at the base of the skull thereby defining a tapered cut through the neck of the bird.

An additional object of the present invention resides in the provision of an improved apparatus for removing heads from birds wherein the neck of the bird is positively guided toward the cutting means of the apparatus.

A further object of the present invention resides in the provision of an improved apparatus for removing heads from birds wherein the loose neck skin of the bird is drawn away from the head of the bird prior to severing of the head from the body.

Another object of the present invention resides in the provision of an improved apparatus for removing heads from birds wherein the guide means associated with the apparatus positions and orients the neck of the bird and helps to direct the neck of the bird toward the cutting means, and through the path of the cutting means to facilitate severance of the head from the body.

An additional object of the present invention resides in the provision of an improved apparatus for removing heads from the birds that includes means for capturing the head of the bird and positively guiding and moving the head toward the cutting path of the cutting means while stretching the neck skin of the bird away from the head prior to severing and pulling the head of the bird through the cutting path of the cutting means to insure positive severance of the head from the body.

A still further object of the present invention resides in the provision of an improved apparatus for removing heads from birds that is economical to manufacture readily adapted to conventional bird processing lines and that is easy and economical to use and is durable in use.

An additional object of the present invention resides in the provision of an apparatus in which a plurality of birds may be processed at one time and in which provision is made for proper orienting of the head of the bird of a multiple processing line to assure severance of the head while cutting from the beak toward the back of the head.

THE DRAWINGS

The novel features which are believed to be characteristic of the present invention are set forth with particularity in the appended claims. The invention itself, however, together with further objects and advantages thereof, will best be understood by reference to the following description taken in connection with the accompanying drawings, in which:

FIG. 1 is a perspective view of a preferred embodiment of the apparatus of the present invention and illustrating one of the devices which may be used for the method disclosed herein;

FIG. 2 is a fragmentary view of the drive means of the apparatus of FIG. 1 showing the motor and motor shaft with a pair of drive sprockets affixed to the motor shaft at spaced intervals therealong;

FIG. 3 is a schematic representation of the drive means for the apparatus of FIG. 1 showing the interconnecting drive linkage between the motor shaft, gear reducing means for the helix and drive sprocket for the cutting means;

FIG. 4 is a schematic representation, in perspective, of an apparatus, with parts removed, showing another form of the present invention having a conditioning shaft, a guide channel and cutting means in a single processing line rather than a double processing line as shown in FIG. 1 of the drawings;

FIG. 5 is a top plan view of the apparatus of FIG. 4 showing the traverse of the helix with respect to and across the guide path;

FIG. 6 is a fragmentary view of the helix, guide means and cutting means of the present invention showing a bird being moved along toward the cutting means;

FIG. 7 is a fragmentary enlarged view schematically illustrating conditioning of the neck skin of the bird by the guide and conditioning shaft of the apparatus prior to severance of the head from the body of the bird;

Figure 8:
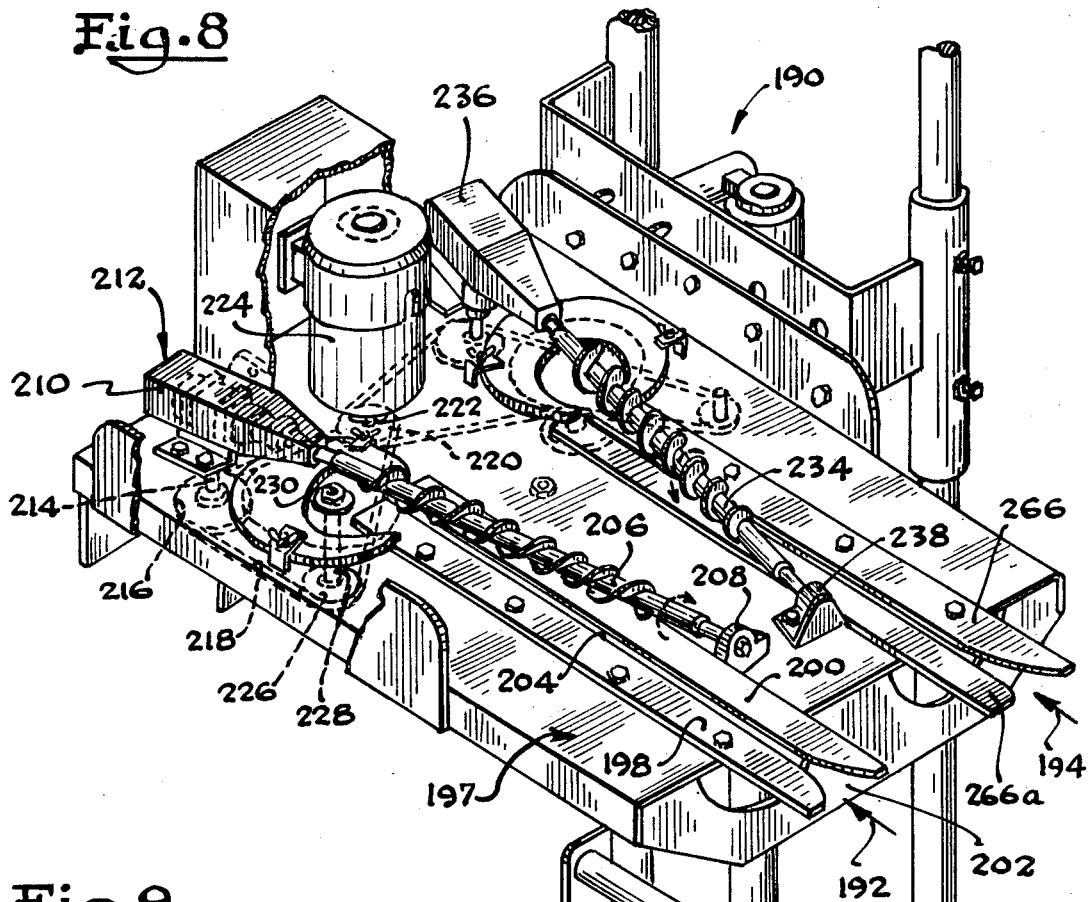
Figure 9:
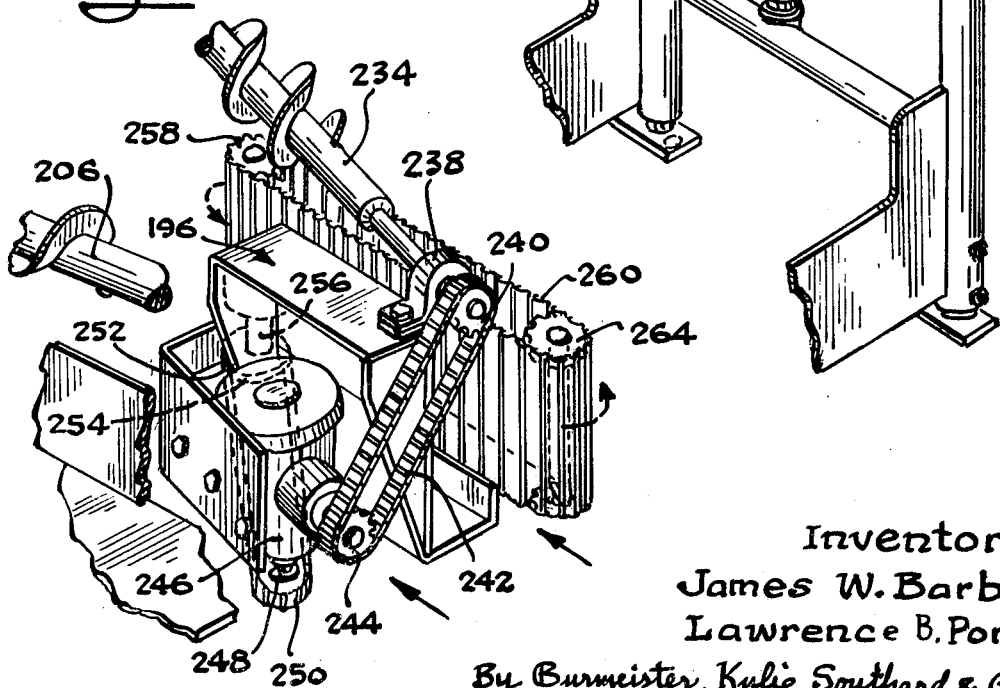

FIG. 8 is a perspective view of another form of the apparatus of the present invention showing another means for processing birds in a dual processing line rather than in a single line; and FIG. 9 is an enlarged fragmentary view of the mechanism used in association with the right guide channel shown in FIG. 8 to properly orient the head of the bird so that the beak will face the cutting means as it moves along the guide path and into the cutting path of the apparatus.

Referring more particularly now to the drawings the preferred embodiment of the apparatus as shown in FIG. 1 of the drawings and is indicated generally at 20 the apparatus includes suitable support means defined by four upstanding legs, 21a, 21b, 21c and 21d. Each of the legs of the apparatus includes a base support plate 22a, 22b, 22c and 22d, respectively. An upstanding post is rigidly secured to each base support plate of each of the legs, respectively, as shown in FIG. 1 at 23a, 23b, 23c and 23d, respectively. The legs 21a and 21b are provided with relatively short caps 24a and 24b, respectively, which are telescopically received over the posts 23a and 23b of each of said legs. The caps 24a and 24b, respectively, are vertically positioned on the posts 23a and 23b by means of the bolt assemblies 25 which extend through openings in each of the caps and engage the posts.

The legs 21c and 21d telescopically receive long support posts 26 and 28, respectively. The support posts 26 and 28 are vertically affixed to the posts 23c and 23d, respectively, by means of the bolt assemblies 25 (one such assembly being shown on leg 21c).

A rigid plate 30 extends between legs 21a and 21d and is rigidly secure at each end to the adjacent leg. A second plate 32 extends between the legs 21b and 21c and, likewise, is rigidly secure to the adjacent leg at its ends. Stabilizing cross members 34 and 36 are added at either end of the apparatus near the base to define a completed rigid rectangular support structure for the apparatus 20.

The preferred embodiment of the apparatus shown in FIG. 1 is intended for use in a dual processing line where two lines of birds are continuously moved along in a processing sequence, one line being brought into each of the head cutting paths of the apparatus shown in FIG. 1. In this way, of course, overall production may be increased over a given period of time.

The dual line processing apparatus 20, of FIG. 1, is mounted on the support base hereinabove defined. The apparatus 20 includes a support bed 38 defined by a flat table-like member having upstanding flanges 40 and 42 along either side thereof. As shown in FIG. 1, the flange 42 is bolted to a U-shaped support member 44 of the apparatus 20. The U-shaped support member 44 is provided with a series of arcuate openings 46, 48, 50, and 52. The arcuate openings 46 and 52, respectively, may define interrupted segments of a common arch, while the openings 48 and 50 may define interrupted segments of another, smaller, common arch. It should be observed, however, that it is not necessary to have the above configuration to provide tilting orientation of the bed 38 as defined hereinbelow. A bolt (not shown) extends through the plate 42 and the arch 46. A second bolt 49 extends through the plate 42 and opening 48 and is secured on the opposite side of the U-shaped support member 44 by a nut. Likewise, bolts 51 and 53 extend through the plate 42 and through openings 50 and 52, respectively, and are secured on the opposite side of the U-shaped support member 44 by nuts. It can readily be seen when the nuts are drawn tight against the rear face of the member 44 and along the bolts 49, 51, 53 and the bolt which is not shown in FIG. 1 the plate 42 will be made rigid with respect to the support member 44. The provision of the arcuate openings noted hereinabove will permit rotation of the bed 38 about the pivot 54 to provide the proper angular orientation of the apparatus 20 for optimum operation of the apparatus. The pivot 54 is defined by a bolt which extends through the plate 42 and member 44 and is rigidly secured to the outer jacket of a jack 56 the jack 56 is rigidly secured at its lowermost portion on the cross member 36 of the support for the apparatus 20. The upper, movable portion of the jack 56 is rigidly secured to the U-shaped member 44. Accordingly, as the moveable portion of the jack member 56 is moved up or down along the support posts 26 and 28 the member 44 will be carried along with it. Accordingly the bed 38 will be positioned in accordance with movement of the jack 56.

As shown in FIG. 1, the ends of the U-shaped support member 44 are secured to tube-like elements 58 and 60 respectively the elements 58 and 60 are telescopically received over the support posts 26 and 28, respectively, and are moved along the posts in accordance with the jack 56. When the apparatus is in the desired vertical position the tube elements 58 and 60 are rigidly secured vertically to the posts 26 and 28, respectively, by tightening of the bolts 62 provided in each of the tube elements 58 and 60. It can readily be understood that tightening of the bolts 62 will cause them to move into engagement with the outer wall of the elements 26 and 28 and to assist in vertical support of the apparatus 20 in combination with the jack 56.

Slotted openings 64 and 66 are defined in the bed 38 and extend from the end 68 of the bed 38 along the bed and beyond the cutting element (to be described hereinbelow). These openings define a general path along which the head of the bird being processed will pass to the cutting means where the head is severed from the body.

Poultry head guide and capturing means are defined by the guide bars 70–72 and 74–76 of the apparatus 20. The guide bars 70, 72, 74, and 76 are rigidly secured to the upper surface of the bed 38 by bolts 78. As shown in FIG. 1 the bolts 78 extend through the guide bars, through the bed 38 and are secured at the bottom surface of the bed 38 by nuts which are threadably received upon the threaded portion of each of said bolts. Suitable adjustment means is provided in the combination of the guide bars in bed 38 whereby the guide bars may be oriented on the bed 38 such that the inner edges are in the desired spaced apart position along the apparatus. It can readily be appreciated that this may be accomplished by providing slots instead of openings in the bed 38 which slots would extend normal to the longitudinal axis of the openings 64 and 66 of the bed 38. This would, of course, permit lateral adjustment of the guide bars 70, 72, 74 and 76 to increase or decrease the opening between the inner edges of the guide bars.

The guide bars 70 and 72 define a first guide path 80 extending along the apparatus 20 and generally aligned with the opening 66 in the bed 38. The inner edges of the guide bars 70 and 72 are spaced apart along a major portion of their length a distance which is just sufficient to permit passage of the neck of a bird to be processed through the apparatus but to prevent withdrawal of the skull and head of the bird from below the guide bars. The free ends of the guide bars 70 and 72 flare generally outwardly, respectively, to define a substantially wider opening at the entry end to permit free passage of the head of the bird into the guide path 80 of the apparatus.

The guide bars 74 and 76 define a second guide path 82 along the bed 38 in a generally aligned relation with the opening 64 in said bed. The guide bars 74 and 76, likewise, are flared at the entry end to permit easy access of the head of the bird to the guide path 82 of the apparatus.

A first helix 84 is rotatably supported at one end in the bearing member 86, which latter member is in turn supported on the bed 38 of the apparatus. The other end of the helix 84 is drivingly associated with the output of a speed reducer 88, which is described in greater detail hereinbelow. The speed reducer is mounted upon the bed 38 by the flanges 90. It can be seen from FIG. 1 that the longitudinal axis of the helix 84 defines an acute included angle with the longitudinal axis of the first guide path 80 with the apex of the angle being defined at approximately the outer periphery of the cutting blade 92.

The helix 84 is defined by a shaft member 84a and a radially extending helical blade 84b having a pitch defining two inch flights along the blade. The flights of the helix 84 capture the neck of the bird as it moves along the first guide path 80 of the apparatus and provides positive movement and guidance for the bird along the path 80 into and through the cutting path defined by the radial edge of the blade 92. Accordingly, the head and neck of the bird may not ride upon the surface of the blade without severance of the head and thereby cause a problem in processing on the line. The neck of the bird is actually pulled through the cutting path and severance of the head from the body of the bird is forced by this positive control provided by the helix 84. As shown by the arrow 85 the helix 84 is adapted to rotate clockwise, as shown in FIG. 1, so that the flight moves the neck of the bird along the path 80 from right to left and from the entry end of the guide path 80 into the blade 92.

The second helix 94 is operatively associated with the second path 82 of the apparatus 20. The second helix is defined by a shaft 94a and a radially extending helical blade 94b which extends along the shaft and defines a helical flight having a two inch pitch from tip to tip of the blades. The helix 94 is rotatably supported at one end in a bearing 96, which in turn is mounted on the plate 38. The other end of the helix 94 is drivingly connected to the output of a speed reducer 98 which is described in greater detail hereinbelow. Speed reducer 98 is secured to the bed 38 by the flanges 100 associated therewith. The helix 94 rotates in a clockwise direction as shown by the arrow 95 so that the neck of the bird is captured between the flights of the helix as it moves along the second guide path 82 and is brought by the flights into the cutitng path defined by the blade 102 of the apparatus. The two inch pitch on the helical blade defines a sufficient distance to securely capture the neck of the bird and to move it along the guide path 82 into the cutting path defined by the outer circumferential edge of the blade 102.

Blade guards 104 are mounted over each of the blades 92 and 102, respectively, to enclose the circumferential edge of the blades along the entire periphery except that area adjacent the guide paths 80 and 82, respectively. The guards 104 define a safety measure for the apparatus. The guards 104 may be held down by the L-shaped clamps and wing nuts 106, shown in FIG. 1. However, any suitable means for clamping the guards to the bed 38 may be employed without departing from the true spirit and scope of this invention.

A drive motor 108 is mounted on the apparatus 20 such that the shaft extends vertically with respect to said apparatus. A motor shield 110 is provided to protect the motor 108 from entry of foreign objects which may damage or impair the operation of the apparatus.

The shaft 112 of the motor 108 extends vertically below the bed 38 of the apparatus, as shown schematically in FIG. 2 of the drawings. A pair of sprockets 114 and 116 are nonrotatably secured to the shaft 112 in axially spaced apart relation thereon. In one embodiment of the invention the sprockets 114 and 116 each are provided with 16 teeth extending about the circumference thereof.

The power chain used to drive the speed reducer, helical shafts, and cutting blade is represented schematically in FIG. 3 of the drawings. As shown in FIG. 3, a link drive chain 118 extends about the sprocket 114 on the motor shaft 112 and to a second sprocket 120 which is nonrotatably secured to the input shaft 122 of the speed reducer 98. The drive chain extends about the sprocket 120 and to a third sprocket 124 which is nonrotatably secured to the shaft 126 of the cutting blade 102 of the apparatus. The drive chain 118 then extends back to the sprocket 114 to complete its drive path. Accordingly, rotation of the motor shaft 112 in the desired direction will transfer power through the chain 118 to the speed reducer 98 and the cutting blade 102. The speed reducer 98, in turn, rotates the helix 94 at the desired speed and in the desired direction for movement of the neck of the bird being processed through the apparatus. The sprocket 120, in one embodiment of the apparatus, was provided with 35 teeth and the sprocket 124, in the same embodiment, was provided with 16 teeth. Accordingly, the cutting blade 102 is rotated in a one-to-one ratio with the rotation of the motor shaft 108, while the input shaft of the speed reducer is rotated at one half the speed of the sprocket 120 which is attached to the shaft 12. This, is due to the two-to-one relationship between the sprockets 114 and 120, the sprocket 114 having 16 teeth and the sprocket 120 having 35 teeth. The drive scheme for the speed reducer 88, helix 84 and cutting blade 92 is the same as that schematically represented in FIG. 3 for the speed reducer 98, helix 94 and blade 102. The power is taken from the lower sprocket 116 on the shaft 112. The chain 120 extends below the drive apparatus associated with the second guide path 82. In all other respects the power transfer is identical to that described in connection with the apparatus in FIG. 3 and associated with the second guide path 82 of the apparatus 20. Accordingly, a further description of the identical power train for the means associated with the first guide path 80 will not be repeated. It can readily be seen that the similar power train would be provided. It should be observed that any suitable drive means may be used in conjunction with this apparatus. For example, flexible belts may be used instead of chains. A direct gear driven means also may be used as well as other drive means known in the art.

As shown in FIG. 1, the cutting blades 92 and 102 are mounted such that they are just above the guide bars 70, 72, 74 and 76, respectively. A sufficient clearance is provided so that rotation of the blades 92 and 102 will not be impeded. However, this clearance need not be great and for practical purposes the cutting path may be defined as being just above the guide bars for the guide paths 80 and 82 and substantially parallel with the upper surface of said guide bars. The helices 84 and 94 may be spaced a couple of inches above the cutting blades 92 and 102 and are intended primarily to move the neck of the bird along the guide paths and into the cutting path defined by the blades. It is important, however, to have the cutting blades mounted as close to the upper surface of the guide bars as possible to sever the head from the body of the bird substantially adjacent the base of the skull.

The poultry may be processed on a single line or a dual line system. The apparatus of the preferred embodiment is specifically intended for a dual line processing system. Accordingly, the poultry processing system using this apparatus will include means for transporting two line of poultry through the processing steps for conditioning of the birds as desired.

In a dual line system the birds generally are moved along the processing sequence with the beaks of the birds facing inwardly. That is, the birds on the dual line system will be in beak to beak relationship.

It has been found that the birds which move into the guide path 80 of the apparatus generally tend to rotate one quarter turn counter-clockwise. This direction of movement is necessary to rotate the head of the bird so that the beak moves into the guide path first. Accordingly, the head of the bird is oriented into provide for the cutting action from the beak, upwardly along the base of the skull and through the neck of the bird to sever the head from the body. This cutting action follows the natural inclination of the skull from the beak to the rear of the head of the bird. Orientation of the head of the bird in this manner provides for severance of the head along a line that will retain the most of the neck of the bird with the body.

It was noted during experimentation with the apparatus described herein that the birds entering the guide path 82 also rotated one quarter turn counter-clockwise upon entrance to said guide path. Accordingly, the birds on the second processing line were oriented such that the beaks were facing rearwardly and away from the initial cutting action of the blade 102. Orientation of the head of the bird in this manner is not desirable. To overcome this problem a head orientation belt is added to the processing line where counter-clockwise rotation of the head of the bird will cause the beak to move rearwardly into the guide channel. Such as the case with those birds moving into the guide channel 82.

A head orientation belt 130 is provided along one side of the guide channel 82. In the preferred embodiment of the apparatus, the head orientation belt 130 is mounted on the inboard side of the guide channel 82 since this is the side of the channel along which the beaks of the birds will be moving. The belt 130 may be comprised of a series of spaced apart rods joined at their ends in moving about sprockets 132 and 134. During use, the beaks of the birds will move into the area of the belt 130 and will be captured between the spaced apart rods of the belt. The belt 130 is moving in the same direction as the bird and slightly faster than the lineal movement of the bird. Accordingly, the head of the bird is rotated clockwise (in FIG. 1) to orient the head so that the beak is facing forwardly in the guide channel 82 and will be first to move into the cutting path of the blade 102.

The power supply for driving the belt 130 is taken from the end of the shaft 84a of the helix 84. A first pulley or sprocket 136 is nonrotatably secured to the end of the shaft 84a outboard the bearing member 86. A drive chain 138 drivingly interconnects the sprocket or pulley 136 with a second sprocket or pulley 140. The sprocket 140 is nonrotatably secured to the input shaft (not shown) of a speed reduction means 142. As was noted earlier, the rotation of the helix 84 is approximately 400 r.p.m. The combination of the shaft diameter 84a, and the interrelationship of the sprockets 136 and 140 is arranged to provide an input r.p.m. to the speed reduction means 142 of approximately 200 r.p.m. The output shaft 144 of the speed reduction means 142 rotates at approximately 100 r.p.m.

A sprocket 146 is nonrotatably secured to the output shaft 144 of the speed reducer means 142. A drive chain (not shown) is drivingly connected between the sprocket 146 on the speed reducing means 142 and a second sprocket (not shown) is nonrotatably secured to the shaft 132a of the head orientation belt drive means. As noted hereinabove the sprocket 146 is rotated at approximately 100 r.p.m. The interrelationship between the drive of sprocket 146 and the second sprocket secured to shaft 132a is arranged such that a further two to one reduction is realized whereby the head orientation belt 130 is driven at approximately 50 r.p.m. by the shaft 132a and sprockets 132 connected thereto.

In processing poultry for removal of the heads of the birds with the apparatus of the present invention, the birds are moved along the dual line in side by side relationship. As noted above, the birds are oriented in beak to beak relation and move along toward the head cutting apparatus in this position. The bird which moves into the guide channel 80 of the apparatus 20 rotates one quarter turn counter-clockwise whereby the beak is facing forwardly in the guide channel 80 and will move into the cutting path of the blade 92 in this manner. It should be observed that the spaced apart relation of the inboard edges of the guide plates 70 and 72 defining the guide channel 80 are spread apart sufficiently to permit free passage of the neck of the bird along the path 80. However, the inboard edges are intended to prevent withdrawal of the head of the bird upwardly between the plates 70 and 72. Accordingly, the head of the bird is trapped immediately below the plates as it moves along the guide path 80, as hereinafter more fully described.

The birds moving along the second line of the procing apparatus move into the guide channel 82 of the apparatus 20. These birds also tend to move one quarter turn counter-clockwise the same as those birds moving into the guide channel 80 of the apparatus. However, the counter-clockwise quarter rotation of the birds in the second processing line will move the beak of the bird so that it faces rearwardly as it moves along the guide channel 82. This is an undesirable orientation of the head of the bird since the back of the skull passes first into the cutting path of the blade 102. Accordingly, the head orientation belt 130 is added to the inboard edge of the guide channel 82 to properly orient the beak of the bird, and thereby the head, within the guide channel 82. As the bird moves into the spaced apart inboard edges of the plates 74 and 76 defining the guide channel 82, the beak is engaged between the rods of the head orientation belt 130. The head orientation belt 130 is moving at about the same speed, or slightly faster, than the lineal movement of the bird along the processing line. The beak of the bird is carried along with the head orientation belt 130 and eventually is moved forwardly with the guide channel 82. A guide plate 150 is mounted on the apparatus opposite the orientation belt 130 and is adapted to trap the head of the bird between the belt 130 and the plate 150. This will prevent undesired orientation of the head of the bird after engagement of the head by the belt 130 for proper orientation with the beak forward in the guide channel 82.

After the head of the bird is initially oriented in the manner hereinabove described it is captured beneath the plates 74 and 76 and cannot be withdrawn therefrom since it will not pass between the inboard edges which define the guide channel 82. Accordingly, the heads of the birds are properly oriented in the guide channel 82 with the beak forward, the same as the birds moving into the guide channel 80.

As the birds move along the guide channels 80 and 82, respectively, they move between flights on the helices 84 and 94, respectively. Each of the helices are rotating clockwise, as shown by the arrows 85 and 95, respectively. This clockwise movement of the helices first causes the head of the bird to be pulled upwardly so that the skull is brought into relatively close engagement with the bottom surfaces of the plates defining the guide channels 80 and 82. Simultaneously with this action, the loose neck skin folded about the neck of the bird is pulled upwardly along the neck and toward the body of the bird is maintained in this upward position by the continued upward rotation of the helices against the neck of the bird. As shown in FIG. 1, the helices extend transversely across the guide channels 80 and 82, respectively. With this structure, the heads of the birds are tightly engaged along the entire path of movement of the birds along the guide channels. Moreover, the flights on each helix extend over the top surface of the cutting blades 92 and 102. Since the necks of the birds are firmly captured between flights of the helices the heads are positively directed and carried along the guide paths 80 and 82 through the apparatus 20 and are carried into and through the cutting path defined by the blades 92 and 102. Accordingly, the heads may not ride at the surface of the cutting path but are firmly carried through for positive and controlled cutting action. With the heads of the birds oriented such that the beaks are facing forwardly the cutting action occurs from the beak along the base of the skull and through the back of the neck. This follows the natural upward contour along the base of the skull and permits retention of the major portion of the neck of the bird with the body. Additionally, movement of the neck skin upwardly by the helices conserves substantially all of the neck skin for use in folding over the cut portion of the neck of the bird, if desired.

Referring now to FIGS. 4 and 5 of the drawings, a processing channel is schematically indicated generally at 152 and includes a guide channel or zone 154 defined by two bars or plates 156 and 158 in coplanar spaced apart relation. The bars 156 and 158 diverge at one end 160 and 162, respectively, to form an ingress for the neck of the fowl. Progressing inward past the ingress, the guide path 164 is substantially the same width along the length of said bars 156 and 158 to the end opposite the flared end of the path 164.

A circular cutting blade 166 is shown mounted on the support means 168 for the assembly and is interposed in the guide path 164 defined by the spaced apart bars 156 and 158. The blade cutting means 166 preferably is non-rotatably secured to a shaft 168 below the plates 156 and 158, and such shaft may be driven by various power sources.

The conditioning shaft is shown generally at 170 and is driven by means 172. The other end of the shaft 170 is shown journalled in a trunnion 174 which may be mounted on any support S. The shaft 170 is shown with a radially extending helix 176 which facilitates the conditioning action.

The shaft 170 is positioned relative to a support S such that its longitudinal axis X—X intersects the central plane Y of the guide path or channel 164 at a point in front of the cutting blade 166.

In the usual processing line for the conditioning of birds for consumption, the bird is pendulously suspended from a shackle 180 (FIG. 6) which in turn is supported on a conveyor or transport means (not shown) to move the bird along the line. The bird is suspended from the shackle 180 in a position such that the neck of the bird moves into and along the path 164 defined by the guide plates 156 and 158. In the usual processing procedure, the head enters the diverging ingress so the beak is laterally disposed relative to the central axis Y—Y of the guide path. As the bird is moved along the guide path 164, the neck is moved between helical segments 176 and captured between the shaft 170, spaced apart segments of the helix 176, and the plates of guide channel 164.

As the bird is moved down the processing line, the neck of the bird is moved into sliding engagement with the plates 156 and 158 of the guide channel 164 and is securely slidably trapped between the shaft and said guide plates during movement toward the cutting blade 166. During processing, the head is rotated or oriented so that the beak is directed towards the blade 166 and is substantially aligned with the central axis Y—Y of said guide channel.

The shaft 170 is rotated in a direction (FIG. 7) such that it moves upwardly against the neck of the bird being processed to move the loose neck skin up with the shaft and pull the head of the bird up and the skin taut along the neck and toward the body. FIG. 7 shows the head laterally disposed to the longitudinal axis of the guide path prior to being finally rotated or oriented towards the front of the channel 164. In this manner the loose neck folds 180 of the bird will not interfere with severance of the head from the body of the bird. The head is held and trapped below the plates 156 and 158 of the guide channel 164 so that the skin may easily be pulled to a taut condition on rotation of the shaft 170 thereagainst, as schematically represented in FIG. 7.

The bird then is moved into the cutting blade 166 indicated schematically as being above the plates 156 and 158. It can readily be seen that the blade 166 will pass through that portion of the neck where the loose neck skin has been withdrawn, and the blade may pass through the neck without interference from the folds 180. The shaft 170, therefore, operates to condition the skin of the neck for improved cutting action, and the shaft also cooperates with the overhead conveyor to urge the bird against the cutting blade.

In FIGS. 8 and 9 a modification 190 of the apparatus 20 is shown for practicing the method in accordance with the disclosure previously set forth. A pair of processing channels 192 and 194 are shown on a table or support indicated shown generally at 196. Parts will be described with particular reference to processing channel 192 although it should be understood that similar parts and structures, not particularly mentioned, will be present where evident in relation to processing channel 194.

Processing channel 192 includes spaced plates or bar guides 198 and 200 which has the diverging opening or ingress 202 and which defines the guide channel 204 therebetween. The conditioning shaft 206 with its helix segments is shown journalled at the forward end in a trunnion 208 mounted on the support 196. The back of the shaft is journalled to the gear box 210 which houses a reducing gear train shown generally as 212. The gear train may selectively rotate the shaft 206 at desired rotational speeds, and such gear train is shown actuated by a shaft 214 which is turned by a pulley 126. The pulley 216 is shown driven by a belt 218 which is drivingly connected to a pulley 220 turned by shaft 222 from a motor 224. A pulley 226 is mounted on a shaft 28 to which is fastened a cutting blade 230.

It is seen that in the embodiment presently described, as in the embodiment of FIG. 1, two birds are adapted to be generally simultaneously delivered to the two processing channels 192 and 194 of the apparatus. Each bird is further adapted to be delivered by an overhead conveyor and shackle assembly as described relative to the showing in FIG. 6. In general, a pair of birds will be delivered to the apparatus 190 so that the heads of the birds are laterally disposed relative to the longitudinal axis of the processing channels, and are further disposed in beak-to-beak relation. As noted above, birds delivered in such positions tend to orient improperly in channel 194, for example. In particular, the bird delivered to processing channel 194 tends to have its head rotated counter clockwise during transit which places its beak rearwardly in the processing channel 194. This is not the desired orientation to attain the best advantages of the invention. It is desired that the head be oriented so that the beak faces the front of the processing channel 194, and any other channel for the most efficient cutting operation. Such a correct orientation is, in fact, attained relative to processing channel 192 where the head of the bird is also rotated counter clockwise but assumes the desired orientation because of the original lateral disposition of the head.

The tendency to assume an incorrect orientation in processing channel 194 is corrected by the mechanism shown in FIG. 8 which is adapted to be mounted within the support 196 under processing channel 194. Shaft 234 of processing channel 196 is turned also by the motor 224 which actuates a gear train in gear box 236 in a manner similar to that described relative to gear box 210. The forward end of the shaft 234 is journalled in trunnion 238 which is shown fixed or mounted to the support 196. The end of shaft 234 extends through the housing and rotates a small sprocket 240 fixed to the end of said shaft. This sprocket turns chain 242 and sprocket 244 which is adapted to actuate a gear train in box 246 so that shaft 248 and sprocket 250 turn at a desired rotational rate. Sprocket 250 is adapted to turn chain 252 which then turns a sprocket 254 which is nonrotatably fixed to shaft 256. Rotating shaft 256 turns a sprocket assembly indicated at 258 which engages and turns chain belt 260 in a counter clockwise direction as indicated by the arrows in conjunction with driven sprocket assembly 258 and idler sprocket assembly 264.

The belt 260 is aligned with and below the edge of the plate guides 266 and 266a in processing channel 194 so that the grid belt may engage the head of the bird and rotate it to the desired, beak forward position, whereupon the head of a bird entering processing channel 194 will be correctly oriented in the same way as a bird entering the processing channel 192.

While a specific embodiment of the invention has been set forth herein it can readily be understood that other modifications and alternative constructions may be used without departing from the true spirit and scope of the invention. It is intended by the appended claims to cover all such modifications and alternative constructions as fall within their true spirit and scope.

What we claim as new and desire to secure by Letters Patent of the United States, is:

1. An apparatus for removing the heads from birds being processed for use, said birds being pendulously suspended and moved along in said manner during processing by transport means, said apparatus comprising:
   support means;
   guide channel means mounted on said support means to receive the guide the necks of the birds as they are moved along the processing line;
   drive shaft means on said support means having a radially extending helix and being mounted in spaced relation to said guide channel means; and
   cutting means on said support means interposed in the path defined by said guide channel means, the head and neck of the bird being transported within the channel, the neck of the bird being conditioned by the driven shaft means and being moved along by the combined action of the transport means and the helix to the cutting means where the head of the bird is severed from the body.

2. The apparatus of claim 1 wherein the longitudinal axis of the driven shaft means intersects the central longitudinal vertical plane of the guide channel means and defines an acute included angle therebetween.

3. The apparatus of claim 2 wherein the cutting means is mounted in close spaced relation to the intersection of the driven shaft means axis and the central longitudinal vertical plane of the guide channel means.

4. The apparatus of claim 1 wherein the helix is rotated upwardly with respect to the neck of the bird to move the neck skin upwardly and draw it taut from the head toward the body of the bird thereby conditioning the neck of the bird for cutting action.

5. The apparatus of claim 4 wherein the cutting means is disposed above the guide channel to sever the neck of the bird in the area where the skin is drawn taut.

6. The apparatus of claim 1 wherein the guide channel means has a substantially straight run path defined by substantially equally spaced elongated members, and the cutting means is defined by a rotatably driven cutting disc in closely spaced relation to the elongated members.

7. The apparatus of claim 1 wherein two support means, guide channel means, driven shaft means, and cutting means are provided and adapted for simultaneously removing the heads from two birds.

8. The apparatus of claim 7 wherein one of the guide channel means is provided with moveable means below said guide channel means to engage and turn the head of a bird so the beak is oriented towards the front of the channel means.

References Cited

UNITED STATES PATENTS

| | | | |
|---|---|---|---|
| 2,854,690 | 10/1958 | O'Donnell | 17—45 |
| 2,924,846 | 2/1960 | Zebarth | 17—12 |
| 3,017,660 | 1/1962 | Reeves | 17—12 |
| 3,271,815 | 9/1966 | Hooley | 17—12 |

LUCIE H. LAUDENSLAGER, Primary Examiner

U.S. Cl. X.R.

17—45